(12) United States Patent
Cheng et al.

(10) Patent No.: US 8,459,104 B2
(45) Date of Patent: Jun. 11, 2013

(54) PRESSURE MEASURING GLOW PLUG

(75) Inventors: Yue Cheng, Liaoning (CN); Bernhard Last, Reutlingen (DE); Hans Houben, Wuerselen (DE); Frank Pechhold, Ludwigsburg (DE)

(73) Assignee: BorgWarner BERU Systems GmbH, Ludwigsburg (DE)

( * ) Notice: Subject to any disclaimer, the term of this patent is extended or adjusted under 35 U.S.C. 154(b) by 13 days.

(21) Appl. No.: 12/936,021

(22) PCT Filed: Mar. 30, 2009

(86) PCT No.: PCT/DE2009/000401
§ 371 (c)(1),
(2), (4) Date: Dec. 14, 2010

(87) PCT Pub. No.: WO2009/121331
PCT Pub. Date: Oct. 8, 2009

(65) Prior Publication Data
US 2011/0146392 A1    Jun. 23, 2011

(30) Foreign Application Priority Data
Apr. 2, 2008 (DE) .................. 10 2008 017 110

(51) Int. Cl.
*G01M 15/08* (2006.01)
(52) U.S. Cl.
USPC ..................................... 73/114.19

(58) Field of Classification Search
USPC ............... 73/114.16, 114.18, 114.19, 114.21
See application file for complete search history.

(56) References Cited

U.S. PATENT DOCUMENTS

| | | | |
|---|---|---|---|
| 7,581,520 B2 * | 9/2009 | Kern et al. | 123/145 A |
| 7,730,771 B2 * | 6/2010 | Ludwig et al. | 73/114.19 |
| 7,954,382 B2 * | 6/2011 | Kern et al. | 73/715 |
| 8,074,502 B2 * | 12/2011 | Mueller et al. | 73/114.19 |
| 2007/0095811 A1 | 5/2007 | Last | |
| 2007/0277617 A1 | 12/2007 | Wolfer et al. | |
| 2007/0295710 A1 * | 12/2007 | Yamada et al. | 219/270 |
| 2008/0028841 A1 * | 2/2008 | Ludwig et al. | 73/115 |
| 2008/0302323 A1 * | 12/2008 | Kern et al. | 123/145 A |
| 2010/0212621 A1 | 8/2010 | Ramond et al. | |
| 2011/0005308 A1 * | 1/2011 | Kern et al. | 73/114.16 |

FOREIGN PATENT DOCUMENTS

| | | |
|---|---|---|
| DE | 103 46 295 A1 | 4/2004 |
| DE | 10 2005 026 074 A1 | 12/2006 |
| WO | WO 2006072510 A1 * | 7/2006 |

* cited by examiner

*Primary Examiner* — Freddie Kirkland, III

(57) ABSTRACT

The invention relates to a pencil-type glow plug, in particular for a self-igniting internal combustion engine. The plug includes at least one plug base with at least one essentially bar-shaped heating element, which projects on one end from the plug base, and at least one measurement element, the heating element and the measurement element being integrally bonded and/or force-locked and/or form-locked.

19 Claims, 3 Drawing Sheets

PRESSURE MEASURING GLOW PLUG

The invention relates to a pencil-type glow plug, in particular for a compression-ignition internal combustion engine.

Such glow plugs are known e.g. from DE 10 346 295 A1. In this design, the measuring element is situated outside of the cylinder head in order to protect it from the high temperatures of the combustion chamber. A design of this type results in a long force-transmission path which results in a low natural frequency and causes noise and phase shifts to occur in the measured result.

If the housing and force-transmission components are composed of different materials, long force-transmission paths result in greater differences in thermal expansion, which leads to corrupted results.

The problem addressed by the present invention is that of creating a pencil-type glow plug that registers pressure values that are largely independent of temperature, the effects of thermal expansion, and other sources of error.

SUMMARY OF THE INVENTION

This problem is solved according to the invention in that the glow plug comprises at least one plug body with at least one substantially rod-shaped heating element that extends out of the plug body at one end and at least one measuring element, wherein the heating element and the measuring element are integrally bonded. It is advantageous that in this way the thermal conduction paths remain limited to a minimum. According to an advantageous embodiment, the plug body is substantially tubular in design. It is advantageous that production is thereby simplified and costs can therefore be reduced.

According to another advantageous embodiment, the plug body is composed of at least two pieces, and comprises at least one upper body part and at least one lower body part. Production is more favorable, which is an advantage.

According to a further advantageous embodiment, the plug body includes at least one central plug part. The advantage of providing a central plug part is that the heating rod is connected, on its side diametrically opposed to the combustion chamber, in an integrally bonded manner to the measuring element on one of its end faces, wherein the measuring element, on its other end face, can be connected to the upper body part and the central body part by a welding ring and its jacket surface. The ceramic heating rod transmits the pressure directly to the measuring element via this rigid connection; there is no need to apply a preload to hold the force-transmission elements together.

According to an advantageous development, the lower body part includes a sealing cone. It is likewise advantageous for the heating element to be substantially encapsulated in a protective tube. This protective tube protects the heating element from potential damage.

According to an advantageous development, the pencil-type glow plug includes at least one sealing element. This sealing element has the advantage that the sensitive measuring elements are protected against corrosive combustion chamber gasses.

According to a further advantageous embodiment, the sealing element has low stiffness in the axial direction and relatively great stiffness in the radial direction. This sealing element has the advantage that the foreign sources of error, e.g. the thermal expansion and deformation of the cylinder head, are largely insulated by the sealing element which is soft in the axial direction, and the force-transmission elements are largely protected by the sealing element which is stiff in the radial direction, and therefore the driving frequency is increased in the radial direction.

According to a further advantageous embodiment, the heating element and/or the protective tube and/or the sealing element are integrally bonded and/or form-locked. The advantage is that the carmine heating element and the sensitive measuring devices are protected against the combustion chamber gasses. According to an advantageous embodiment, the sealing element and the protective tube are single-pieced in design. Reducing the protective tube and the sealing element to a single part delivers production and cost advantages. The reason for this is that a weld that is not there provided cannot become permeable, and an impermeable protective tube that functions as a sealing element protects the sensitive parts against corrosive combustion chamber gasses.

According to another advantageous embodiment, the measuring element includes at least one sensor for determining pressure, and/or at least one sensor for determining temperature. The advantage is that any measurement errors that can be caused by temperature fluctuations can be compensated for.

For instance, if the sensor—as the measurement strip—for determining temperature is situated on the measuring element in a region that remains largely unaffected by stresses and changes in stress, this temperature sensor can be used as a reference value transmitter and can be used to help correct the overall measurement result.

According to another advantageous embodiment, the measuring element is composed of a material that has a piezoelectric effect that is largely independent of temperature in its working temperature range, e.g. quartz or $GaPO_4$.

BRIEF DESCRIPTION OF THE DRAWINGS

Particularly preferred embodiments of the invention are described in greater detail in the following with reference to the associated drawings.

DETAILED DESCRIPTION

Figure 1:
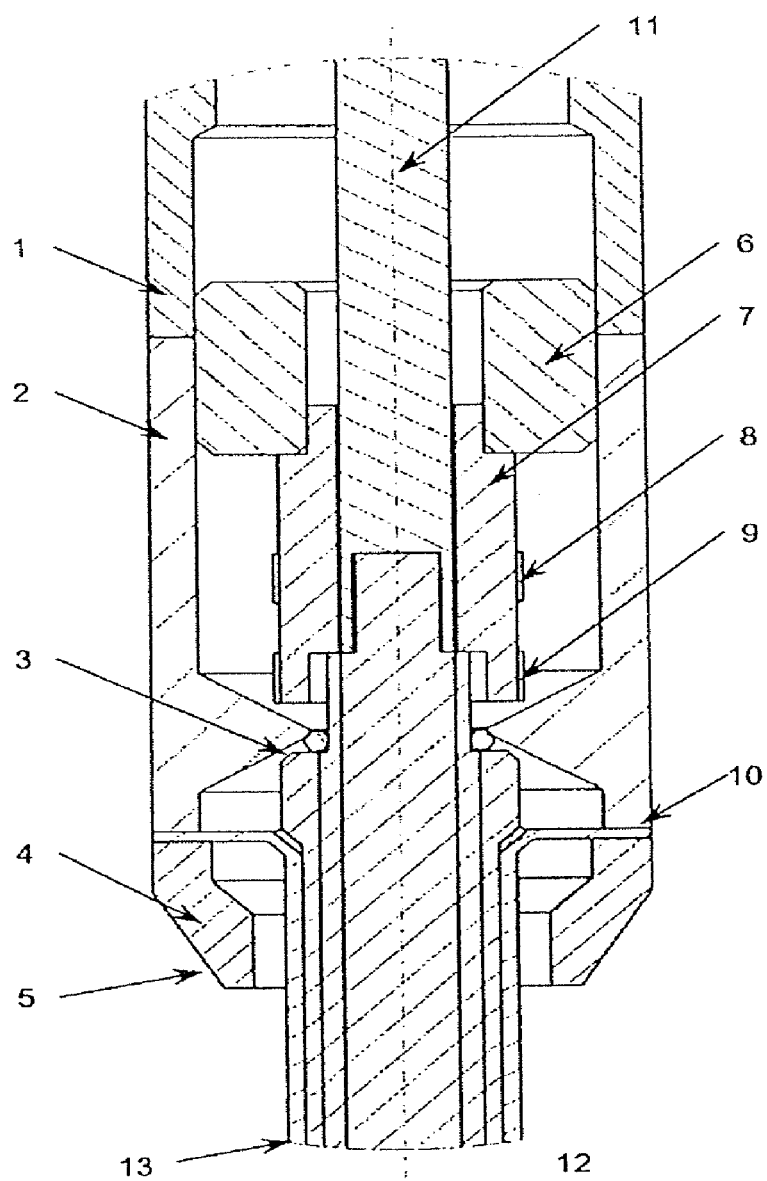
FIG. 1 pencil-type glow plug

The pencil-type glow plug depicted in FIG. 1 includes an upper body part 1, a central body part 2, a ceramic heating rod 3, and a lower body part 4. A sealing cone 5 is disposed on lower body part 4. Inner pole 11 is disposed on the end face of heating rod 3 facing away from combustion chamber 12; measuring element 7 and welding ring 6 are disposed around inner pole 11.

Figure 2:
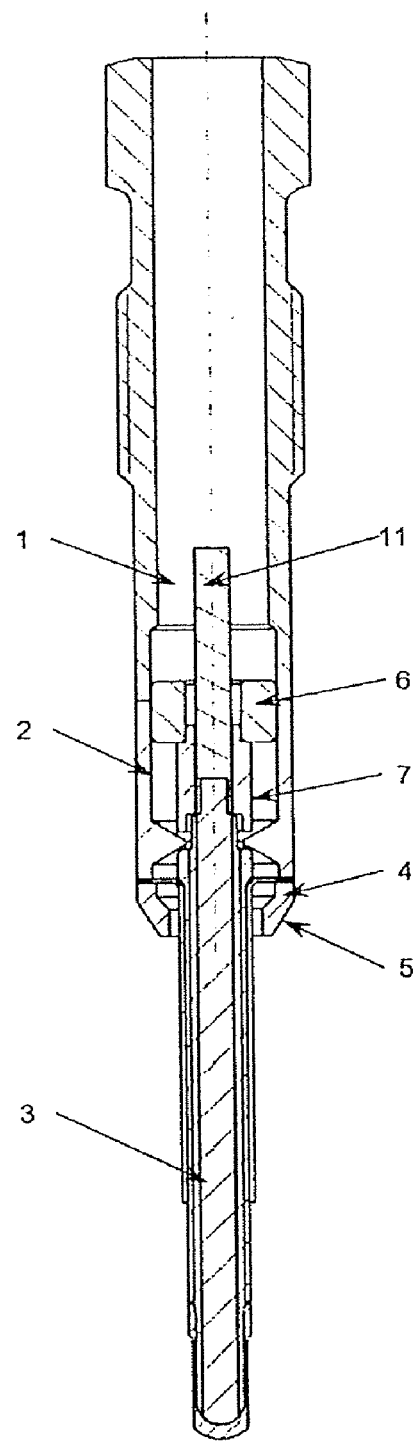
FIG. 2 a cross section through the glow plug depicted in FIG. 1

FIG. 2 shows a cross section of the glow plug depicted in FIG. 1. The glow plug includes an upper body part 1 which is disposed above central body part 2. A ceramic heating rod 3 is disposed, in particular, in the region of central body part 2 and lower body part 4 in such a manner that it is inserted into measuring element 7 on the side facing away from combustion chamber 12, and is integrally bonded and/or force-locked or form-locked to inner pole 11. A sealing cone 5 is disposed on lower body part 4. Inner pole 11 is disposed on the end face of heating rod 3 facing away from combustion chamber 12 in such a manner that measuring element 7 and welding ring 6 are disposed around inner pole 11 in a substantially concentric manner. Measuring element 7 and welding ring 6 are force-locked and/or form-locked and/or integrally bonded. Welding ring 6 is force-locked and/or form-locked and/or integrally bonded to upper body part 1 and/or to central body part 2. A diaphragm, which transitions into a protective tube 13 and is single-pieced in design, is disposed between central body part 2 and lower body part 4. In an alternative embodiment, diaphragm 10 is welded together with protective tube 13. Protective tube 13 substantially encloses the part of heating rod 3 that extends into combustion chamber 12, and protects it and the inner region of body parts 1, 2, 4 against combustion chamber gasses.

Tubular measuring element 7, which is annular and deformable, is composed of a material that is elastic up to values of 200 bar and 200 degrees Celsius, and has a constant elastic modulus. Measuring element 7 is composed e.g. of ceramic. In one embodiment according to the invention, the measuring element is composed substantially of $ZrO_2$. An elastic sensing element 8 is disposed on the jacket surface of measuring element 7. In a special embodiment, elastic sensing element 8 includes a strain gauge for determining the deformation of measuring element 7, on the basis of which the state in combustion chamber 12 can be deduced.

Figure 3:
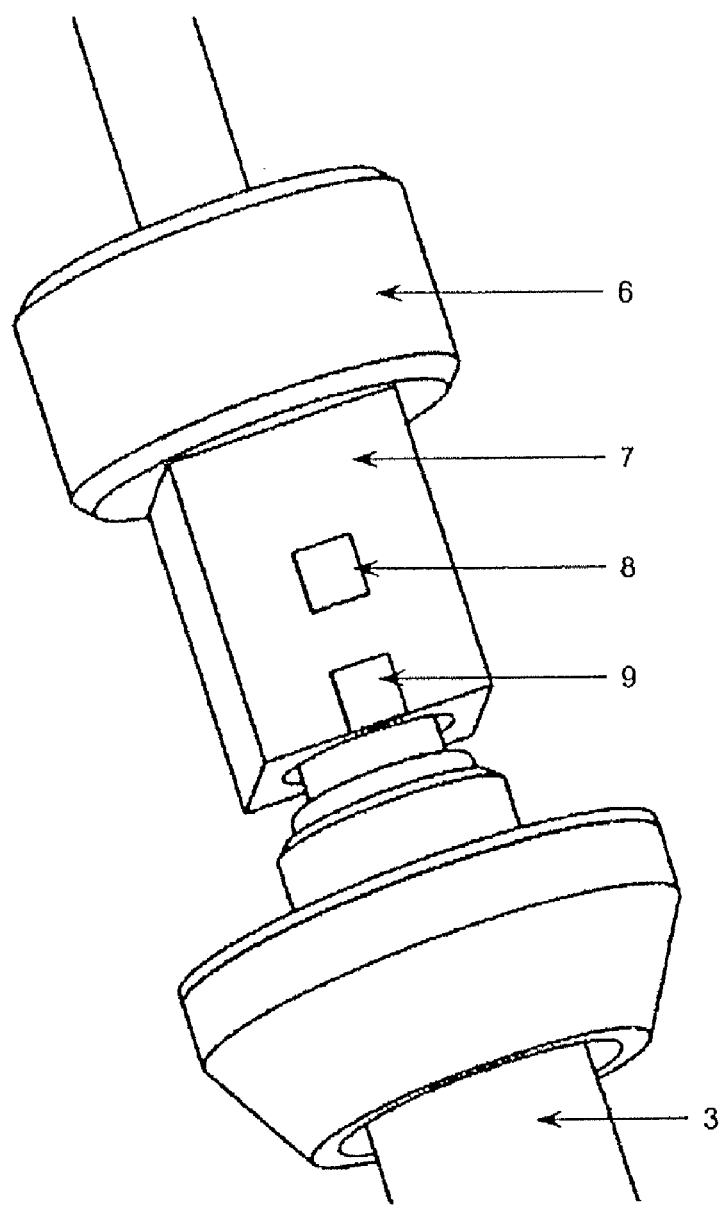
FIG. 3 a top view of the measuring element depicted in FIG. 2

FIG. 3 shows a depiction of elastic element 7. The electrical resistance of strain gauges 8, 9 (DMS) changes in response to slight deformations. They are used as strain sensors by bonding them, using a special adhesive, to parts that deform to a minimal extent under load. The resultant deformation or expansion of strain gauge 8 causes its resistance to change. Measurements performed using strain gauges are converted e.g. using bridge circuits, in particular the quarter bridge, half bridge, and full bridge. Strain gauges are used in embodiments as wire strain gauges, film strain gauges, semiconductor strain gauges, or circular strain gauges. Elastic element 7 is disposed between welding ring 6 and ceramic heating rod 3, wherein, to compensate for temperature, strain gauge 9 is disposed in a region of elastic element 7 that is designed to be largely load-free. Strain gauges can be used to detect changes in the shape of expansions or compressions on the surface of components. Strain gauges make it possible to determine loads by experimentation, and to formulate a claim about the load on the material in its actual range of application. Strain gauge 8 is composed e.g. of a film strain gauge, wherein the measuring grid film is composed of resistance wire that is approximately 3 to 8 μm thick. The measuring grid film is laminated and etched out on a thin plastic carrier, and is equipped with electrical contacts. In a special embodiment, strain gauge 8 includes a second thin plastic film on its top side. The second plastic film is securely bonded to the carrier in order to mechanically protect the measuring grid. In a further embodiment, a plurality of strain gauges is disposed on one carrier in a defined geometry.

Constantan or NiCr compounds are used in film strain gauges. The shape of the measuring grid is dependent on its use and is oriented to the specific applications. The length of the measuring grid is approximately 0.2 to 150 mm. The carrier films of strain gauges 8, 9 are composed of acrylic resin, epoxy resin, phenolic resin, or polyimide. In special embodiments, strain gauges that function in a piezoelectric, stress-optical, or capacitive manner are used. In practice, they are used in special applications. Capacitively acting strain gauges are used in the high-temperature range above 1000° C. Strain gauges 8, 9 are composed of metallic conductors or semiconductors that change their resistance when they expand. When strain gauge 8, 9 expands, its resistance increases. When a strain gauge compresses, its resistance decreases. Semiconductors change their resistance to greater extent, by approximately 50 to 80 times as much, than do metallic conductors.

The change in resistance observed when strain gauge 8, 9 is mechanically loaded is caused by the geometric deformation of the measuring grid and by the change in the specific resistance of the material of which the measuring grid is composed. Different strain gauge materials result in different values for sensitivity, the so-called k-factor, of the strain gauge.

Constantan is selected for use in standard strain gauge applications due to its low temperature dependence and despite its low k-factor. If a greater temperature range is required, or if the aim is to measure temperatures below −150° C., then NiCr is used as the measuring grid material. The maximum strainability of strain gauge 8, 9 is mainly dependent on the strainability of the measuring grid material. Further dependencies relate to the adhesive, its strainability and binding strength, and the material of which the carrier is composed. The values for maximum strainability at room temperature are approximately in the range of a few 1000 μm/m for semiconductor strain gauges, and up to 50000 μm/m for film strain gauges.

The nominal resistance of a strain gauge is the resistance that is measured between the terminals without loading the strain gauge; it is e.g. 120, 350, 700 or 1000 ohms. The maximum voltage at which a strain gauge may be operated is dependent on its size and the material to which it was bonded. The power loss that occurs on the strain gauge resistor must be dissipated across the surface of the strain gauge. When materials having good thermal conductance are used, typical values are approximately 5 to 10 volts; when small strain gauges and materials having poor thermal conductance are used, 0.5 volt is applied, for example.

Semiconductor strain gauges are highly temperature-dependent and can therefore be used in defined applications. Temperature errors are compensated for by the Wheatstone bridge circuit. In addition, since all four bridge branches are formed on the same chip, the effects in the individual bridge branches are more realistic than if four different semiconductor strain gauges would be bonded and interconnected. When constantan and NiCr strain gauges are used, the temperature influence is minimal; above 100° C., the signal for constantan changes by less than 1%. Every material to be measured expands as temperature increases. This expansion does not correspond to a load if it occurs without restriction. One does not want to measure this expansion. This is largely achieved in certain approaches by using "adapted" strain gauges i.e. the manufacturer imparts an additional temperature effect to strain gauge 8, which results in a signal that is the inverse of the expansion effect which is induced by the temperature variation of the material on which it is disposed. This type of compensation functions only in a certain temperature range, and is incomplete—every material has a specific thermal expansion which is also dependent on the pretreatment of the material which has been rolled or annealed, for example. Complete compensation is achieved using active measures e.g. by also measuring the temperature effect using a strain gauge 9 on the unloaded component and subtracting it from the signal on the loaded component using the Wheatstone bridge circuit (half bridge) or a processor. NiCr strain gauges are suitable for use when temperature differences exceed 150° C. and higher. The change in resistance is typically detected by integration into an electrical circuit, the Wheatstone bridge circuit, and is fed, as a voltage signal, to an amplifier which is not depicted.

Three measuring procedures for strain gauges are available.
1. The carrier frequency method which utilizes 200 Hz to 50 kHz as the carrier frequency
2. The d.c. voltage method
3. The constant-current method Using the constant-current method, it is possible to use long lines for the individual bridge circuits without the signal being corrupted. The cable losses are compensated by electronic circuits for the carrier frequency method and the d.c. voltage method. Carrier frequency and direct voltage differ mainly in terms of the signal bandwidth that is attainable by commercially available amplifiers: For direct voltage, up to approximately 100 kHz is typical, and for carrier frequency, usually only a few 100 Hz up to approximately 3 kHz are typical. A further difference has to do with their susceptibility to interference which, however, is also dependent on the particular environment and application. The carrier frequency method is insensitive to thermoelectric voltages, common-mode interferences (electrical interferences), and—if the interference frequencies are outside of the carrier frequency plus/minus the bandwidth—against mating contact interferences (magnetic interferences). However, a plurality of carrier frequency amplifiers must be synchronized with each other to prevent mutual interference. Direct voltage amplifiers can be used in the laboratory or under optimal conditions. Carrier frequency measuring amplifiers are more advantageous under industrial conditions, in which measurements must often be carried out in the presence of strong interference fields. This is dependent on the frequencies of stray radiation and amplifiers that are involved.

List of Reference Characters
1. Body part
2. Central body part
3. Ceramic heating rod
4. Lower body part
5. Sealing cone
6. Welding ring
7. Elastic element/measuring element
8. Elastic sensing element
9. Temperature compensation
10. Diaphragm (with protective tube)
11. Inner pole
12. Combustion chamber
13. Protective tube

The invention claimed is:

1. A pencil-type glow plug for a compression-ignition internal combustion engine having a combustion chamber, the plug comprising at least one plug body with at least one substantially rod-shaped heating element that extends out of the plug body at a distal end and at least one measuring element, wherein the measuring element is integrally bonded or form locked on to a side of the heating rod that is diametrically opposed to the combustion chamber to thereby transmit pressure from the combustion chamber directly to the measuring element, wherein a proximal portion of the heating element is circumferentially surrounded by a portion of the measuring element.

2. The pencil-type glow plug according to claim 1, wherein the plug body is substantially tubular in design.

3. The pencil-type glow plug according to claim 1, wherein the plug body is composed of at least two pieces, and includes at least one upper body part and at least one lower body part.

4. The pencil-type glow plug according to claim 1 wherein the plug body includes at least one central plug part.

5. The pencil-type glow plug according to claim 1 wherein the lower body part includes a sealing cone.

6. The pencil-type glow plug according to claim 1 wherein the heating element is substantially encapsulated by a protective tube.

7. The pencil-type glow plug according to claim 1 wherein it includes at least one sealing element.

8. The pencil-type glow plug according to claim 1 wherein the heating element and/or the protective tube and/or the sealing element are integrally bonded and/or form-locked.

9. The pencil-type glow plug according to claim 1 wherein the sealing element and the protective tube are single-pieced in design.

10. The pencil-type glow plug according to claim 1 wherein the measuring element includes at least one sensor for determining pressure, and/or at least one sensor for determining temperature.

11. The pencil-type glow plug according to claim 1 wherein the measuring element is composed of a material that has a piezoelectric effect that is largely independent of temperature in its working temperature range.

12. The pencil-type glow plug according to claim 1 wherein the measuring element is composed of a material that is elastic up to values of 200 bar and 200 degrees Celsius, and has a constant elastic modulus.

13. The pencil-type glow plug according to claim 1 wherein the measuring element includes an elastic sensing element that is a strain gauge for determining the deformation of the measuring element on the basis of which the state in combustion can be deduced.

14. The pencil-type glow plug according to claim 1 wherein the plug body is composed of one upper body part, one lower body part, one central plug and a diaphragm which is welded together with a protective tube to substantially enclose the part of the heating rod that extends into the combustion chamber, and protect it and the inner region of the body parts against combustion chamber gases.

15. A pencil-type glow plug for a compression-ignition internal combustion engine having a combustion chamber, the pencil-type glow plug comprising:
at least one plug body;
at least one substantially rod-shaped heating element extending out of the plug body at a distal end;
an inner pole disposed on the end face of the heating element facing away from combustion chamber; and
at least one measuring element,
wherein the heating element is inserted into the measuring element on a side of the measuring element facing away from the combustion chamber and is integrally bonded and/or force-locked or form-locked to the inner pole and the measuring element is integrally bonded or form locked on one of its end faces to a side of the heating rod that is diametrically opposed to the combustion chamber to thereby transmit pressure directly to the measuring element, wherein a proximal portion of the heating element is circumferentially surrounded by a portion of the measuring element.

16. A pencil-type glow plug for an internal combustion engine, comprising:
a substantially cylindrical plug body;
a heating rod extending out of the plug body along its distal end and extending within the plug body along its proximal end; and
an elastic measuring element disposed within the plug body and defined as comprising an inner surface and an outer surface, wherein the inner surface is fixed relative to the heating rod and wherein the outer surface is fixed relative to the plug body;
wherein at least a portion of the elastic measuring element is circumferentially disposed around the proximal end of the heating rod.

17. The pencil-type glow plug of claim 16, including a first elastic sensing element attached to the outer surface of the elastic measuring element.

18. The pencil-type glow plug of claim 17, wherein the elastic measuring element comprises a stress-free integrally formed extension.

19. The pencil-type glow plug of claim 18, including a second elastic sensing element attached to the stress-free integrally formed extension of the elastic measuring element.

* * * * *